T. BRADY.
CONVEYER APPARATUS.
APPLICATION FILED APR. 12, 1920.

1,435,048.

Patented Nov. 7, 1922.
6 SHEETS—SHEET 2.

Inventor
Thomas Brady
By his Attorney

Patented Nov. 7, 1922.

1,435,048

UNITED STATES PATENT OFFICE.

THOMAS BRADY, OF BAYONNE, NEW JERSEY.

CONVEYER APPARATUS.

Application filed April 12, 1920. Serial No. 373,237.

*To all whom it may concern:*

Be it known that I, THOMAS BRADY, citizen of the United States, and resident of Bayonne, in the county of Hudson and State of New Jersey, have invented certain new and useful Improvements in Conveyer Apparatus, of which the following is a specification.

This invention relates to a conveyer apparatus which is specially adapted to charging an ice house with cakes of ice and discharging it therefrom. The conveyer apparatus may also be used for various other materials.

The organization of the invention comprises a conveyer with endless linked chains, which for a portion of their total lengths have journaled therein rollers, while the remaining lengths of the linked chains are devoid of rollers. This provides a clearance space for cakes of ice handled by the apparatus, to pass between the chains and deposited on the floor of the building or upon the top face of the tier of ice previously deposited into the building.

The endless linked chains with their rollers are provided with suitable framing, a drive cage and a take up cage. Means are provided for hoisting the frame with its appurtenances, and other means move the frame and its appurtenances to different parts of the ice house in which it is being used. The ice house is provided on the outside with the usual elevator and conveyer. Suitable gravity conveyers are used to handle the ice between the conveyer outside of the building and the conveyer with the rollers in the building which latter is described in detail hereinafter.

In the accompanying drawings and specification some exemplifications of the invention are shown and described and which may be varied to suit different situations within the spirit of the claims.

Fig. 5ª shows a partial section of Fig. 3 on the line 5ª, 5ª.

Referring to the accompanying drawings an ice house for storage of ice is indicated in its entirety by the numeral 20. The house consists of the front wall 21 with the opening 22, the rear wall 23, the side wall 24, 25, the roof 26 supported on roof trusses 27, with the horizontal or bottom members 28. Posts 29 support the longitudinal side girders 30 and the latter in turn support the members 28 of the roof trusses 27. Inner sheathing 31 is indicated adjacent to the side walls 24 and 25 and forms therewith the pockets 32 and 33.

A conveyer in the ice house is indicated in its entirety by the letter A and comprises an upper runway consisting in this instance of a pair of angle irons 36, that have fastened thereto the upper tracks 37. A lower runway consists of the channel irons 40, that have fastened thereto the lower tracks 41. The runways are supported on a plurality of frames B, a frame C and angle irons 42. A plurality of inclined struts 43 are interposed between the upper and lower runways to secure stability. Skids 44 are shown leading to the channel irons 40.

At one end of the conveyer A, Figs. 1 to 5ª, is indicated a drive cage D, which comprises the vertical side posts, in this instance channel irons 45 and 46, which at their bottom ends are fastened to the channel irons 40 of the conveyer. The upper ends of the channel irons 45 and 46 are connected by the longitudinal side girders, in this instance angle irons 47. The channel irons 45, 46 are also connected by the cross girders, in this instance the angle irons 48. Openings are formed in the channel irons 45 for the stop board 49. Intermediate posts, in this instance channel irons 50 also connect the channel irons 40 and the angle irons 47. The angle irons 36 of the upper runway are fastened to the channel irons 45 and 50. Channel irons 51 are connected to the outer ends of the angle irons 36 and to the channel irons 40. Guide brackets 52 with bifurcated ends 52$^a$ extend from the channel irons 45 for the stop board 52$^b$. Supporting cross plates 53 are fastened to the channel irons 40 for the tracks 54. An electric motor 55 with the armature shaft 56 is adjustably supported on the tracks 54. Brackets 57 are fastened to the channel irons 45 and support the journal brackets 58. Journal pins 59 are journaled in the journal brackets 58 and sprocket chain wheels 60 are fastened to the pins 59. Brackets 61 are fastened to the channel irons 51 and carry the journal brackets 62. Pins 63 are journaled in the journal brackets 63 and have fastened thereto the sprocket chain wheels 64. Journal brackets 65 are fastened to the channel irons 50 and have journaled therein a shaft 67. Spur gears 68 and sprocket chain wheels 69 are fastened to the shaft 67. Journal brackets 70 are fastened to the upper ends of the channel irons 50. A shaft 71 is journaled in the journal brackets 70. Pinions 72 are fastened to the shaft 71 and mesh with the spur gears 68. A pair of similar pulleys 74, 75 each with similar cone shaped portions 76 are loosely supported on the shaft 71. The cone shaped portions 76 constitute the male members of a friction clutch. A double female member of the clutch is indicated with the portions 77 in which are formed internal tapered walls 78, that can register with the cone shaped portions 76. An annular channel 79 is formed between the portions 77. The female member with the portions 77 is slidably supported on the shaft 71. A spline not shown is interposed between the shaft 71 and the said female member. A bracket 82 extends from one of the channel irons 50 and has pivoted thereon a shifting lever 83 with the forked end 84. Pins 85 extend from the forked end 84 and engage the channel 79. On the shaft 56 are fastened the pulleys 86 and 87. A straight belt 89 connects the pulleys 74 and 86 and a twisted belt 90 connects the pulleys 75 and 87. A spring actuated drum 91 of well known construction leads wires 92 for electric current to the motor 55.

On the other end of the conveyer A is detachably connected a take up cage E, Figs. 1, 2 and 6 to 9 which comprises the outer uprights, in this instance channel irons 93, that are fastened to the channel irons 94 at their lower ends. A cross angle iron 95 connects the upper ends of the channel irons 93. Angle irons 96 have their lower ends fastened to the channel irons 94 and their upper ends are connected by the angle iron 97. Angle irons 98 vertically above the channel irons 94 connect the upper ends of the channel irons 93 and the angle irons 96. The angle irons 96 have openings in which is detachably supported the stop board 99. Brackets 99$^a$ similar to 52 extend from the channel irons 100 for the stop board 99$^b$. The channel irons 100 have their upper ends connected to the angle iron 97 and their lower ends are detachably fastened to the channel irons 40 by means of bolts 101. The angle irons 36 are detachably connected to the channel irons 100 by means of bolts 102. The channel irons 40 have a series of openings 103 and the angle irons 36 have a series of openings 104, by means of which the channel irons 100 of the cage E can be connected to the channel irons 40 and to the angle irons 36 at different points, to take up lost motion of the conveyer chains to be described hereinafter. A pair of brackets 110 are fastened to the channel irons 100 and in each is supported a journal pin 111. Sprocket wheels 112 are journaled on the pins 111. Channel irons 114 are secured to and between the channel irons 94. Angle irons 115 are fastened to and supported upon the channel irons 94 and 114. A pair of frames 116 are supported upon the angle irons 115. Each of the frames 116 has a cavity 117 at its upper end with the end walls 118. A dovetailed slide 119 is slidably supported upon the top of each frame 116. An interiorly threaded lug 120 extends from the lower face of each slide 119. A journal bearing 121 with the cap 122 extends from the upper face of each slide 119. A spindle 123 extends through one of the end walls 118 of each frame 116 and collars 124 on the spindle 123 abut against the opposite faces of the end walls 118 to maintain the spindles in place.

A threaded portion 125 formed with each spindle 123 engages the threads of the lugs 120. Journal brackets 130 with the journal bearings 131 and 132 extend from the channel irons 93. One end of each of the spindles 123 is journaled in one of the journal bearings 131. A bevel gear 133 is fastened to each of the spindles 123. In each of the journal bearings 132 is journaled one end of a vertical spindle 135, which has fastened to its lower end a bevel gear 136, that meshes with its accompanying bevel gear 133 on the spindle 123. A bevel gear 137 is fastened to the upper end of each of the spindles 135. Journal brackets 140 140ᵃ and 141 are fastened to the channel irons 93. The bracket 140 has formed therewith the journal bearings 142 and 143, and the journal bracket 140ᵃ has formed therewith the journal bearings 142, 143 and 143ᵃ. The journal bracket 141 has formed therewith the journal bearing 144. The upper ends of the vertical spindles 135 are journaled in the journal bearings 142. A horizontal shaft 150 is journaled in the journal bearings 143 and 143ᵃ. Bevel gears 151 are fastened to the shaft 150 and mesh with the bevel gears 137. A spur gear 153 is fastened to the horizontal shaft 150.

The journal bracket 141 has journaled therein an axle 156 which has fastened thereto at one end the hand wheel 157 and at the other end the pinion 158. The latter meshes with the spur gear 153. In each of the journal bearings 121 is journaled a shaft 160 which has fastened thereto a sprocket chain wheel 161. By means of the hand wheel 157, and its connections with the slides 119, the latter can be moved to nicely adjust the locations of the sprocket wheels 161, to maintain the proper tension in the conveyer chains to be described.

Figure 1:
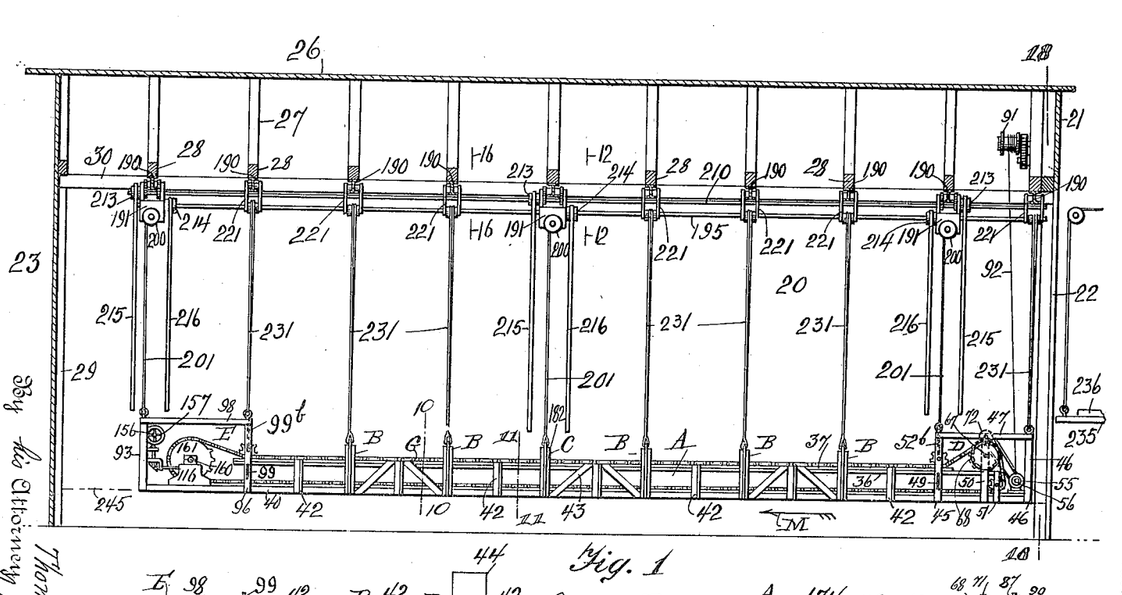
Fig. 1 represents a side elevation of the conveyer apparatus with a longitudinal section of a building in which it is installed.
Figure 2:
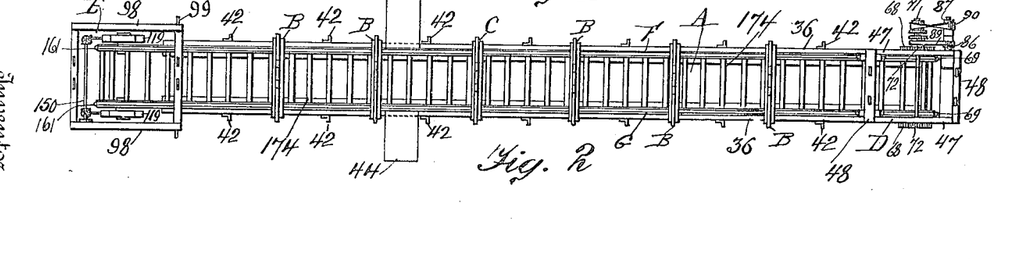
Fig. 2 shows a partial top plan view of the apparatus.
Figures 3, 4, 5, 5A:
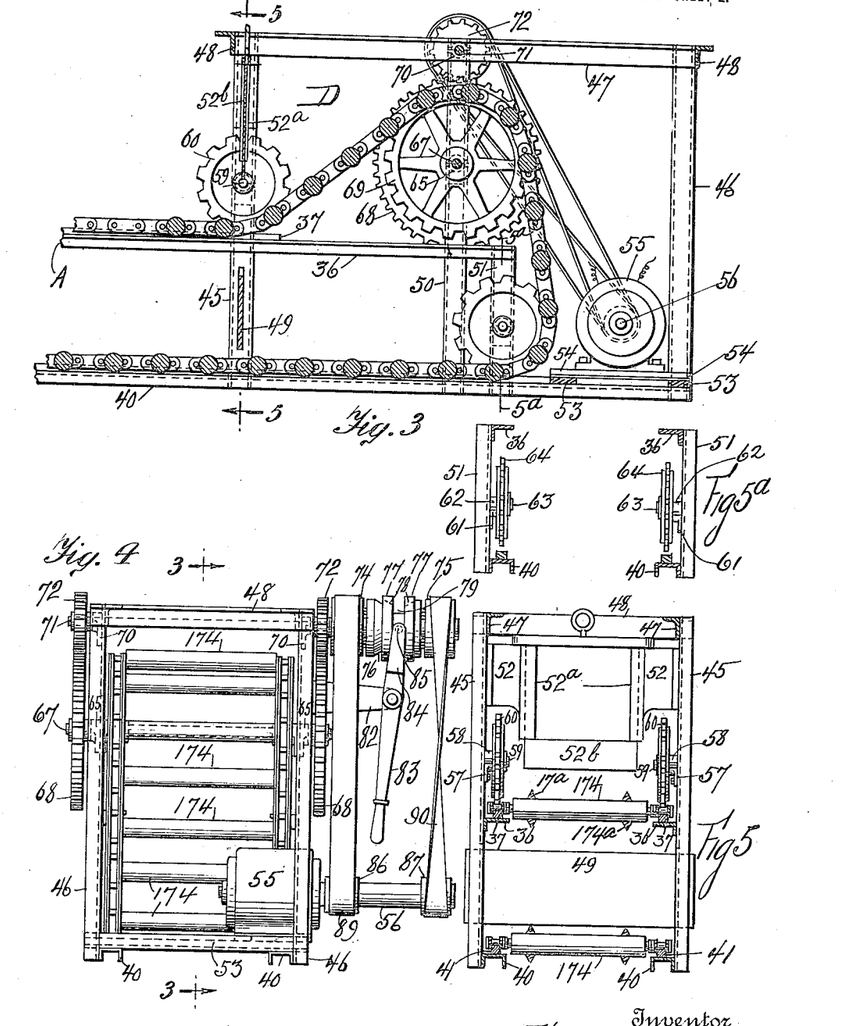
Fig. 3 is a section of Fig. 4 on the line 3, 3.
Fig. 4 represents a right hand end view of Fig. 3.
Fig. 5 is a section of Fig. 3 on the line 5, 5.
Figure 6:
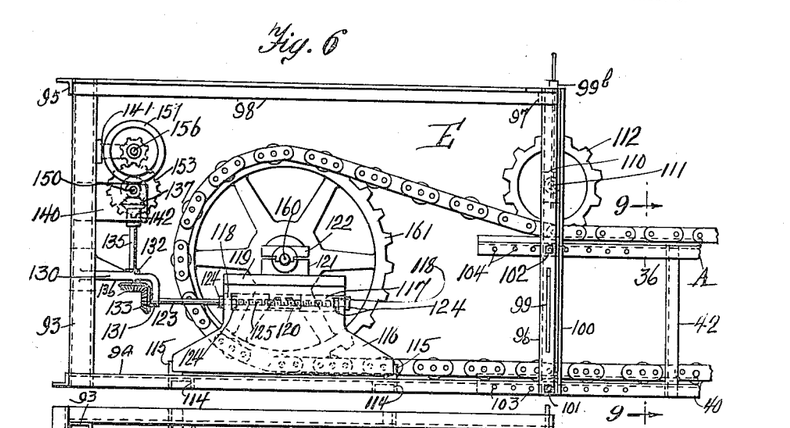
Fig. 6 shows an enlarged portion of the left hand end of Fig. 1.
Figure 7:
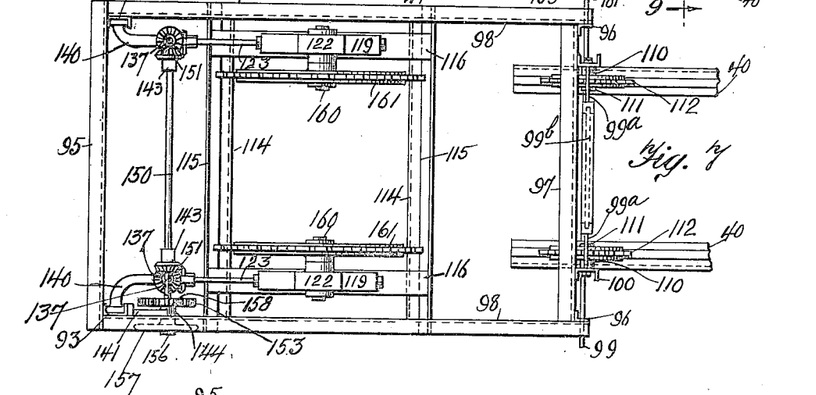
Fig. 7 is a top plan view of Fig. 6.
Figure 8:
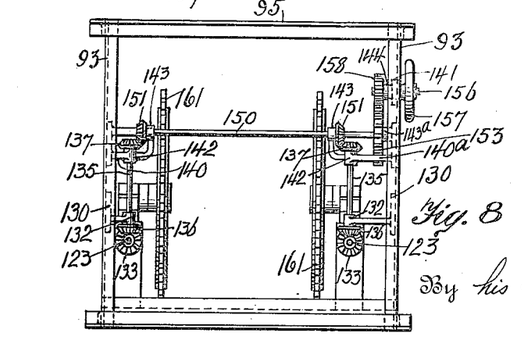
Fig. 8 represents a left hand end view of Fig. 6.
Figure 9:
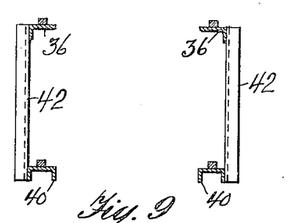
Fig. 9 shows a partial section of Fig. 6 on the line 9, 9.
Figure 10:
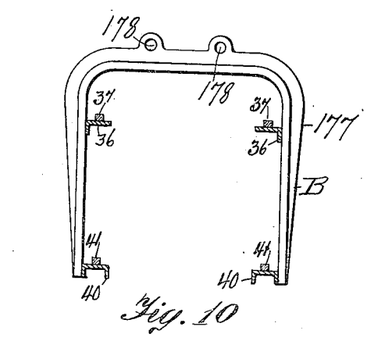
Fig. 10 shows a partial enlarged section on the line 10, 10 of Fig. 1.
Figure 11:
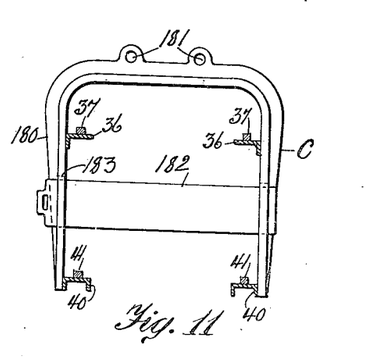
Fig. 11 is a partial enlarged section of Fig. 1 on the line 11, 11.
Figures 12, 13, 14, 15, 16, 17:
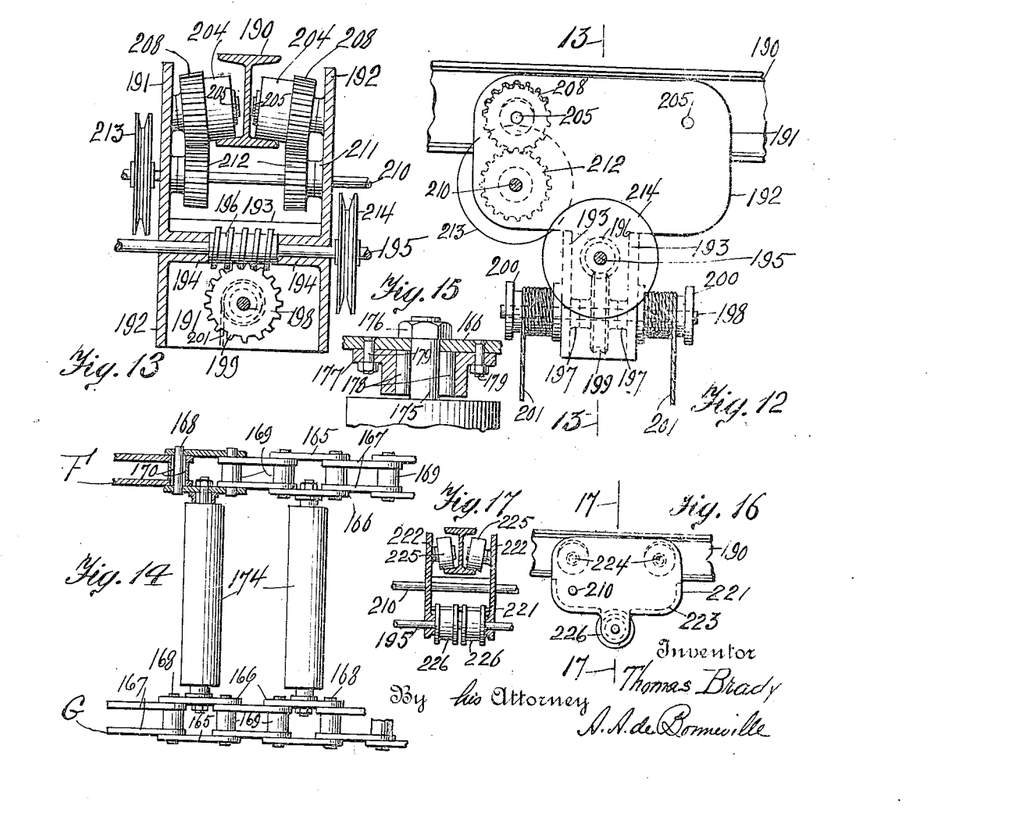
Fig. 12 shows an enlarged section of Fig. 1 on the line 12, 12.
Fig. 13 is a section of Fig. 12 on the line 13, 13.
Fig. 14 represents an enlarged fragmentary top plan view of the conveyer of the apparatus with a partial horizontal axial section thereof.
Fig. 15 is an enlarged fragmentary portion of Fig. 14.
Fig. 16 shows an enlarged fragmentary section of Fig. 1 on the line 16, 16.
Fig. 17 is a section of Fig. 16 on the line 17, 17.
Figures 18, 19:
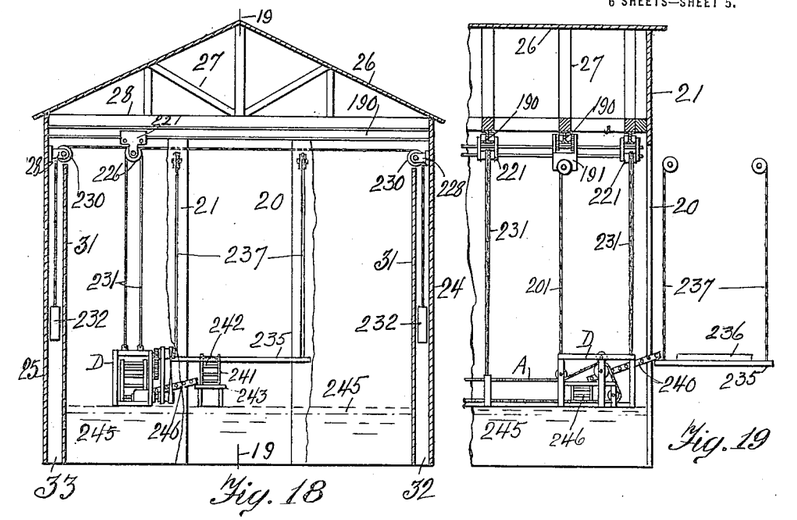
Fig. 18 represents a partial right hand end view and section of Fig. 1 on the line 18, 18.
Fig. 19 shows a partial left hand view and section of Fig. 18 on the line 19, 19.

The conveyer of the apparatus comprises a pair of linked chains F and G. Each of the latter consists of outer links 165, 166 and the pair of inner links 167. Pins 168 extend through and connect the links. The inner links 167 are separated by the rollers 169 which are journaled on the pins 168. Roller bearings 170 are provided for the rollers and bear on the pins 168.

Rollers 174 are connected in this instance to the alternate outer links 166. Each roller 174 has extending from its opposite ends the journal pins 175 with the nuts 176. Journal bearings 177 with the roller bearings 178 are secured to the links 166 by means of the bolts 179. The journal pins 175 are supported on the roller bearings 178. It will be noted by an inspection of Figs. 3 and 6, that the rollers 174 are connected to only about one-half the total lengths of the linked chains F and G.

The frames B are U-shaped with the strengthening rib 177 that has formed therewith the openings 178. The frame C is similar in construction to the frame B and of which there may be one or a plurality. Each frame C has formed therewith the strengthening rib 180 with the openings 181. A stop board 182 is detachably supported in openings 183 formed in said frame C.

To the lower faces of the horizontal members 28 of the roof trusses 27 are fastened the I beams 190. On a number of the I beams are carried the hoisting trolleys 191. Each of the trolleys 191 comprises side plates 192 which are connected by the cross members 193. Journal bearings 194 are formed with the side plate 192 for the shaft 195, that extends through all the trolleys 191, as well as other trolleys to be described. Between each pair of bearings 194 on the shaft 195 is fastened a worm 196. Each of the cross members 193 has formed therewith a journal bearing 197 in which is journaled a worm wheel shaft 198, that has fastened thereto a worm wheel 199 that meshes with the adjacent worm 196. Each worm wheel shaft 198 has fastened thereto drums 200 to each of which is fastened one end of a rope 201 or a chain. Each trolley 191 is provided with four trolley wheels 204 that are journaled on axles 205 supported in the side plates 192. A pair of the wheels 204 has fastened thereto the bevel gears 208.

A shaft 210 is journaled in bearings 211 formed with the side plates 192. A pair of bevel wheels 212 are fastened to the shaft 210 and mesh with the bevel wheels 208. The shaft 210 is also journaled in other trolleys of the apparatus to be described.

A sprocket chain wheel 213 is fastened to the shaft 210 for each hoisting trolley 191 to propel it on the I beams 190 and a sprocket chain wheel 214 is fastened to the shaft 195 for each trolley 191 to turn the drums 200 and thereby either wind or unwind the ropes 201. The sprocket chain wheels 213 are provided with hand chains 215 and the sprocket chain wheels 214 are provided with hand chains 216.

The ropes 201 at their lower ends are attached to the openings 178 of the frames C and to the cages D and E.

To the remaining lower or horizontal members 28 of the roof trusses 27 are also attached I beams 190. On each of the latter I beams 190 is located a four wheel trolley 221. Each of the latter trolleys comprise the side plates 222 connected by the connecting members 223. A pair of axles 224 extends from each side plate 222 and a roller 225 is journaled on each axle 224. The shafts 195 and 210 extend through the side plates 222.

On the shaft 195 between the side plates 222 are journaled the guide sheaves 226.

To the side walls 24 and 25 of the ice house are fastened journal brackets 228 in which are journaled guide sheaves 230. Ropes 231 have each one end extended through the openings 178 and are fastened to the frames B. Ropes 231 are also fastened to the cages D and E. The ropes 231 pass over the guide sheaves 226 then extend over the guide sheaves 230, lead into the pockets 33 and have attached thereto the counter weights 232.

On the outside of the ice house is movably located a platform or elevator 235 provided with a conveyer 236 and which is suspended from cables 237 by means of which it can be located at different levels.

Referring particularly to Figs 1, 2, 18 and 19 appurtenances are shown, which with the apparatus already described are used to store ice in the ice house 20. These appurtenances consist of a gravity conveyer 240 comprising the side sills 241 in which are journaled rollers 242. A table 243 is located upon the tier of ice 245 in the ice house. The conveyer 240 connects the platform 235 which is located above the top face of the tier of ice 245 with the table 243. A second gravity conveyer 246 similar to 240 leads from the table 243 to the rollers 174 of the conveyer A, when said rollers are in their lowered level.

Figure 20:
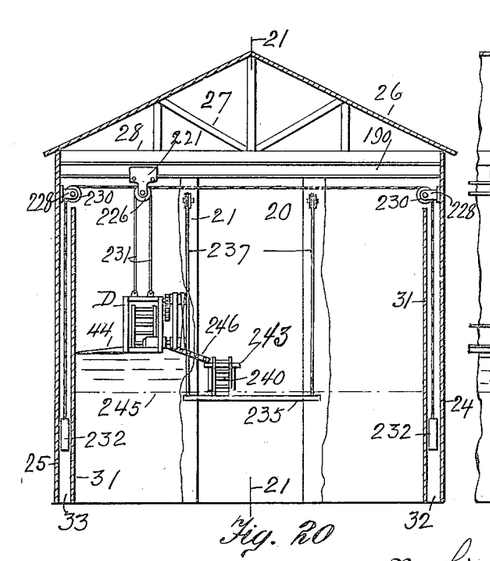
Fig. 20 represents a view similar to Fig. 18 with some of the elements in a different position.
Figure 21:
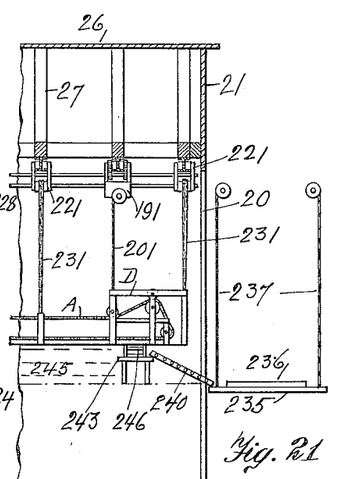
Fig. 21 shows a partial left hand end view and section of Fig. 20 on the line 21, 21.

In Figs. 20 and 21 similar appurtenances are shown to discharge ice from the ice house 20. In this instance the gravity conveyer 246 leads from the rollers 174, when they are in their lower level, to a table 243 which is located upon the top tier of ice 245 and the gravity conveyer 240 leads from the table 243 to the platform 235 which latter in this instance is located below the face of the top tier of ice 245.

Figure 22:
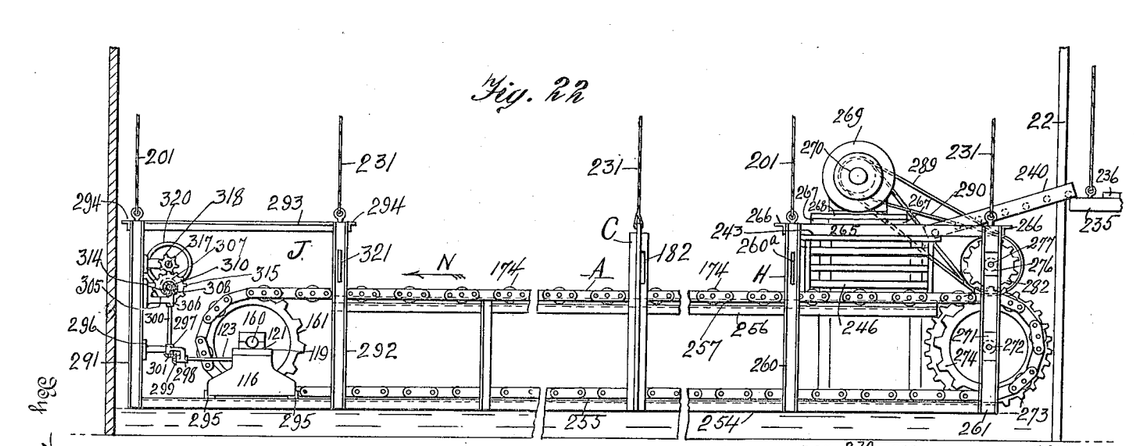
Fig. 22 represents an elevation of a modification of the conveyer apparatus and Fig. 23 is a partial top plan view of Fig. 22.
Figure 23:
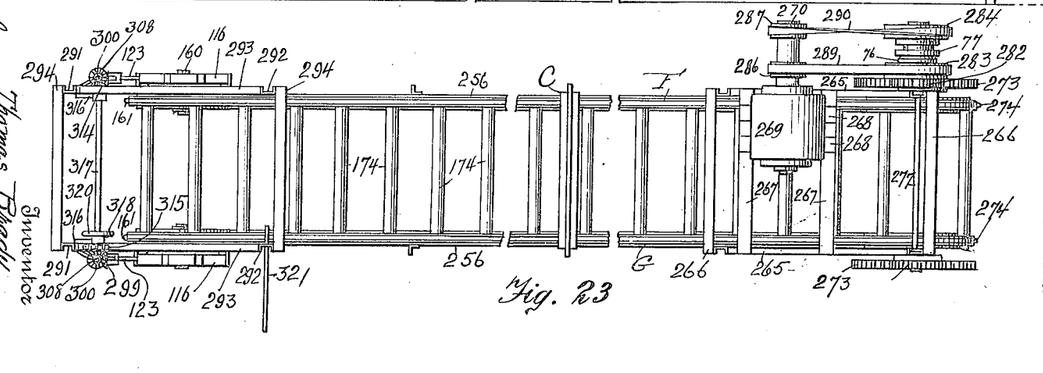

In Figs. 22 and 23 a modification of the invention is shown by means of which a greater length of operation is obtained than with the apparatus heretofore described. With the appurtenance shown in Figs. 1 to 21 the conveyer A, charges and discharges ice by locating the cakes on the rollers 174 when they are on their lower level.

With the modification shown in Figs. 22 and 23 the ice is collected and discharged when the rollers 174 are in their upper level.

In Figs. 22 and 23 the conveyer A is indicated with its rollers 174 at the upper level. The driving cage is shown at H and the take up cage at J. The said cages are connected by bottom channel irons 254 with tracks 255 respectively similar to 40 and 41 and upper angle irons 256 with tracks 257 respectively similar to 37 and 36. The driving cage H comprises the vertical channel irons 260, 261 which at their bottom ends are connected to channel irons 254 and at their upper ends are connected by the longitudinal angle irons 265 and the angle irons 266. The channel irons 260 are also fastened to the angle irons 256. Openings are formed in the channel irons 260 for the stop board 260ª. Plates 267 are secured to the angle irons 265 and support tracks 268, for the motor 269 having the armature shaft 270. Brackets 271 are fastened to the channel irons 261 and in which are journaled axles 272. A spur gear 273 is journaled on one end of each axle 272 and a sprocket chain wheel 274 is fastened to the other end of each axle 272. Brackets 276 are also fastened to each of the channel irons 261. A shaft 277 similar to the shaft 71 is journaled in the brackets 276.

Pinions 282 similar to 72 are fastened to the shaft 277 and mesh with the spur gears 273. Pulleys 283, 284 similar to 74 and 75 are loose on the shaft 277.

A friction clutch with the members 76 and 77, as already described, is provided for the shaft 277.

Pulleys 286, 287 similar to 86 and 87 are fastened to the armature shaft 270 and belts 289 and 290, similar to 89 and 90 connect the said pulleys with the pulleys 283 and 284. The take up cage J comprises the vertical channel irons 291 and 292, which at their lower ends are fastened to the channel irons 254. Longitudinal angle irons 293 connect the channel irons 291 and 292 at their upper ends and angle irons 294 also connect the channel irons 291 and 292. Upon the channel irons 254 are fastened a pair of angle irons 295 similar to 115. Frames 116 with slides 119 as already described are supported on the angle irons 295. Shafts 160 with sprocket chain wheels 161 as already described are journaled in the journal boxes 121. A pair of brackets 296 with the journal bearings 297 and 298 extend from the channel irons 291. Spindles 123, as already described, have each one end journaled in the journal bearings 298 and have fastened thereto the bevel gears 299. Vertical spindles 300 similar to 135 have their lower ends journaled in the journal bearings 297. Bevel gears 301 on the lower ends of the spindles 300 mesh with the bevel gears 299. Brackets 305 with the journal bearings 306 and 307 extend from the channel irons 291. The upper ends of the spindles 300 are journaled in the journal bearings 306. Bevel gears 308 are fastened to the upper end of the spindles 300. A shaft 310 is journaled in the journal bearings 307. Bevel gears 314 are fastened to the shaft 310 and mesh with the bevel gears 308. A spur gear 315 is fastened to the shaft 310. Journal brackets 316 extend from the channel irons 291 and have journaled therein the operating shafts 317. A pinion 318 fastened to the shaft 317 meshes with the spur gear 315. A hand operating wheel 320 is fastened to the shaft 317. In the channel irons 292 are openings for the stop board 321. Chains 201 and 231 with the appurtenances as already described are provided for this modification of the invention. The elevator 235 is shown adjacent to the opening 22 of the building. The gravity conveyer 240 leads to the table 243. The gravity conveyer 246 connects the table 243 with the rollers 174 of the conveyer A, when said rollers are at their upper level. The rollers 174 may be modified by having connected thereto or formed on their cylindrical surfaces the V-shaped rings 174ª, which prevent the ice carried by the rollers from laterally sliding therefrom.

To operate the conveyer apparatus shown in Figs. 1 to 21 inclusive the ice is brought up to the opening 22 of the ice house, by means of the conveyer 236 on the elevator 235 in the usual manner. The said elevator being located at different levels as the level of the top tier of the ice 245 varies. The operator causes the ice to slide down the gravity conveyer 240 to be deposited upon the table 243. From the latter the ice is moved down the gravity conveyer 246 to the rollers 174 of the conveyer A. The said rollers are located in their lower level when the cakes of ice are deposited thereon. The conveyer with the linked chains F and G is now started, by means of the shifting lever 83 and travels in the direction of the arrow M carrying cakes of ice up to the stop board 99. When the first cake of ice deposited on the rollers 174 meets the said stop board the lower level of the conveyer is fully charged. The conveyer is kept running in the same direction and as it travels the portion of the linked chains F and G which is devoid of the rollers 174 will move to the bottom level of the conveyer A, and the cakes of ice will drop between said linked chains to the floor of the ice house or upon the top face of the ice already installed. While the linked chains F and G which are devoid of the rollers 174 are in their lower level, cakes of ice are not moved down on the gravity conveyer 246. After the cakes of ice have been discharged through the linked chains the operator raises the conveyer A, by means of the hand chains 216. The said hand chains turn the sprocket chain wheels 214 and thereby the shaft 195 is turned, thus causing all the ropes or chains 201 to simultaneously pull up the conveyer A. Next the operator by means of the hand chains 215 turns the sprocket chain wheels 213 and thereby the trolleys 191 and 221 are moved on the I beams 190 to another position. The conveyer is then again lowered by means of hand chains 216 and the table 243 and gravity conveyers are located in proper position between the conveyers A and 235 to again charge the said conveyer A. These operations are continued for the whole width of the building. Next the conveyer A is located upon the finished top tier of ice and another tier is installed, the conveyer A being gradually moved to the side of the house from which it was moved.

To discharge the cakes of ice from the ice house the rollers 174 may be charged with the cakes of ice to be taken out either when said rollers are at their upper or lower levels. The skids 44 may be used by the operators to deposit the cakes of ice upon the rollers 174. In case the ice is deposited upon the rollers 174 when they are in their lower level, the conveyer is moved in a direction opposite to the arrow M and the stop board 49 prevents the cakes of ice being deposited in the drive cage D. The cakes of ice are next directed from the rollers 174 to the gravity conveyer 246. The ice is then deposited on the table 243 and from the latter it is slid down the gravity conveyer 240 and then is led on to the conveyer 236 of the elevator 235, which with this operation is located below the table 243. In case the cakes of ice are to be taken from the building 20 upon the rollers 174 when they are in their upper level, the rollers are moved in a direction opposite to the arrow M and the stop board 52ᵇ prevents the cakes of ice being deposited into the drive cage D. When the cakes of ice reach the stop board 52ᵇ they are led out of the house as already described. In case the cakes of ice are to be deposited into the building when the rollers are in their upper level they are led thereon as already described and the stop board 99ᵇ is used to prevent the cakes being deposited into the take up cage E.

After the rollers 174 have carried the ice 245 so that the first cake is in contact with the stop board 99ᵇ, the stop board 182 is inserted in the frame C and the stop board 52ᵇ is inserted in the openings in the channel irons 45. The conveyer is moved in the direction of the arrow M which will cause the rollers that are in the upper level to take an opposite direction and as the linked chains F and G reach the upper level the cakes of ice will drop through them at both the upper and lower levels, between the stop boards 182 and 99ᵇ. The same result can be obtained without using the stop board 182. The linked chains devoid of rollers being about one-half the total length of the endless conveyer one-half of the same can be discharged as just described.

To discharge the portion between the stop board 182 and the drive cage D, the movement of the conveyer is reversed so that the conveyer at its upper level will move in the direction of the arrow M, and about one-half of the linked chains devoid of links will move to the top level and one-half will remain on the lower level and the cakes of ice will drop to the floor of the ice house.

To operate the modification of the invention shown in Figs. 22 and 23 the linked chains F and G are moved in the direction of the arrow N, when the ice is being installed into the building. The stop boards 182 and 260ª are removed and the stop board 321 prevents the cakes of ice being deposited into the take up cage J. Gravity conveyers are employed to lead the ice from the rollers 174. When the ice is to be taken out of the building the operations may be the same as those described for the conveyer shown in Figs. 1 and 2, or a conveyer may be employed with the rollers connected thereto throughout the whole of its length and the cakes may move through the take up cage H and leave the conveyer at its extreme right hand end. When so used the stop boards 182 and 260ª are removed. The other operations with this modification are similar to those already described.

Having described my invention what I desire to secure by Letters Patent and claim is:

1. In an apparatus the combination of a conveyer comprising linked chains and rollers for supporting the objects to be conveyed, connected to the linked chains for a portion of their lengths.

2. In an apparatus the combination of a conveyer comprising endless linked chains, means to move the linked chains, rollers for supporting objects to be moved connected to the linked chains for a portion of their lengths and means to hold said objects while the conveyer is moving to bring the portions of linked chains devoid of rollers to the initial position of the portion of linked chains having the rollers connected thereto, to permit the objects previously supported on the rollers to be discharged from the conveyer between the portions of the linked chains thereof devoid of rollers.

3. In an apparatus the combination of an endless conveyer, a frame for the conveyer, tracks one over the other in the frame of the conveyer, a take-up cage at one end of the frame, a drive cage at the other end of the frame, the said conveyer comprising a pair of endless link chains supported on said tracks, rollers connecting the linked chains for a portion of their lengths, the said drive cage comprising a pair of sprocket chain wheels coacting with the tracks at their lower level and a pair of sprocket chain wheels coacting with the tracks at their upper level, a third pair of sprocket chain wheels in said drive cage for the linked chains and a motor to turn the third pair of sprocket chain wheels.

4. In an apparatus the combination of an endless conveyer, a frame for the conveyer, tracks one over the other in the frame for the conveyer, a take up cage at one end of the frame, a drive cage at the other end of the frame, the said conveyer comprising a pair of endless linked chains supported on said tracks, rollers connecting the linked chains for a portion of their lengths, the said take up cage comprising a pair of frames, a slide supported in the frames in the take up cage, a journal bearing for each slide, a shaft journaled in each journal bearing, a sprocket chain wheel for the linked chains fastened to each shaft and take up means connected to said slides.

5. In an apparatus the combination of a conveyer, a frame for the conveyer, runway tracks over the conveyer, trolleys on some of the runway tracks, hoisting means for the frame with its conveyer connected to the trolleys, other trolleys on the remaining runway tracks, guide sheaves journaled in the latter trolleys, guide sheaves journaled at the opposite ends of the runway tracks carrying the latter trolleys, pairs of ropes with one end of each fastened to the frame, one rope of each pair leading over one of the guide sheaves in one of the latter trolleys, then passing over the guide sheave at one end of its runway track, a counterweight for the other end of the rope, the other rope of each pair leading over the other guide sheave of its accompanying trolley, then leading over the guide sheave at the other end of the runway track and a counterweight at the other end of the latter rope.

Signed at Bayonne, in the county of Hudson and State of New Jersey, this 9th day of April, A. D. 1920.

THOMAS BRADY.